United States Patent [19]
Noguchi et al.

[11] Patent Number: 5,280,362
[45] Date of Patent: Jan. 18, 1994

[54] DIGITAL COPIER FOR COPYING A BICOLORED DOCUMENT AT THE SAME SPEED AS A MONOCOLORED DOCUMENT

[75] Inventors: Koichi Noguchi, Tokyo; Hiroshi Takahashi, Kawasaki; Tomotoshi Nakahara, Yokohama; Yuji Yasuda, Tokyo; Michihito Ohashi, Kawasaki, all of Japan

[73] Assignee: Ricoh Company, Ltd., Tokyo, Japan

[21] Appl. No.: 933,575

[22] Filed: Aug. 24, 1992

Related U.S. Application Data

[63] Continuation of Ser. No. 715,687, Jun. 14, 1991, abandoned.

[30] Foreign Application Priority Data

Jun. 15, 1990 [JP] Japan ................... 2-158106

[51] Int. Cl.$^5$ ............... H04N 1/29; G01D 15/06
[52] U.S. Cl. ....................... 358/300; 358/296; 346/157
[58] Field of Search ............... 358/75, 300, 296; 346/157; 355/326, 327

[56] References Cited

U.S. PATENT DOCUMENTS

| | | | |
|---|---|---|---|
| 4,686,579 | 8/1987 | Sakamoto | 358/462 X |
| 4,791,452 | 12/1988 | Kasai | 358/300 X |
| 4,833,505 | 5/1989 | Furuya et al. | 355/326 |
| 4,860,048 | 8/1989 | Itoh et al. | 355/326 X |
| 4,885,596 | 12/1989 | Egawa et al. | 346/157 |
| 4,959,695 | 9/1990 | Nishimura et al. | 355/326 X |

FOREIGN PATENT DOCUMENTS 56-87058 7/1981 Japan.
1-228269 9/1989 Japan.

Primary Examiner—Benjamin R. Fuller
Assistant Examiner—Eric Frahm
Attorney, Agent, or Firm—Oblon, Spivak, McClelland, Maier & Neustadt

[57] ABSTRACT

An electrophotographic digital copier capable of identifying a particular color existing in a document image. The copier copies both of a bicolor document and a monocolor document in the same period of time. Even when monocolor documents and bicolor documents are to be copied together, the copier executes monocolor copy processing with the former and bicolor copy processing with the latter automatically.

5 Claims, 8 Drawing Sheets

DIGITAL COPIER FOR COPYING A BICOLORED DOCUMENT AT THE SAME SPEED AS A MONOCOLORED DOCUMENT

This application is a continuation of application Ser. No. 07/715,687, filed on Jun. 14, 1991, now abandoned.

BACKGROUND OF THE INVENTION

The present invention relates to an electrophotographic digital copier capable of identifying a particular color existing in a document image and, more particularly, to an electrophotographic digital copier capable of producing a bicolor hard copy by a single image transfer.

An electrophotographic digital copier is extensively used which scans a photoconductive element or similar medium by a light beam issuing from a light source to electrostatically form a latent image and develops the latent image by a toner. This type of copier is operable not only as an ordinary copier but also as an output unit included in a facsimile transceiver or a computer. A current trend in the imaging art is toward bicolor or multicolor recording to meet the increasing demand for color recording and to implement color copiers.

A copier capable of producing a bicolor hard copy is disclosed in, for example, Japanese Patent Laid-Open Publication No. 228269/1989. The copier taught in this Laid-Open Publication produces a bicolor hard copy by repeating a copying sequence twice. In the first copying sequence, the copier scans a document image to identify a particular color, i.e., a first color, produces image data representative of the first color, executes predetermined image processing with such image data, writes the image data on a photoconductive element while binarizing the data, develops the written image, transfers the developed image to a recording medium in the form of a paper sheet, fixes the image on the paper sheet, and then temporarily stacks the paper sheet or copy on a refeed tray. In the second copying sequence, the copier scans the same document again to identify a second color different from the first color, produce image data of the second color, executes predetermined processing with the image data, writes the image data on the photoconductive element while binarizing the image data, develops the written image, refeeds the paper sheet carrying the image of the first color from the refeed tray, and then transfers the image of the second color to the paper sheet.

The problem with the above-described conventional copier is that the period of time necessary for a bicolor image to be formed is several times longer than the period of time necessary for a monocolor image to be formed since the copying process has to be repeated twice. Moreover, since the image reading and image transfer is repeated twice each, it is extremely difficult to cause the images of two different colors into register with each other. The above-mentioned Laid-Open Publication discusses various kinds of systems such as one using an image transfer drum and one forming a plurality of images of different colors on a photoconductive element as prior art. However, none of such systems is capable of automatically separating a particular color existing in a document image and transferring toner images of two colors from a photoconductive element to a paper sheet at the same time, i.e., copying a bicolor document at the same speed as a monocolor document.

Japanese Patent Laid-Open Publication No. 87058/1981 discloses an electrophotographic apparatus of the type forming images of two different colors on a photoconductive drum at the same time by a single rotation of the drum. This Laid-Open Publication, however, does not mention an implementation for identifying a particular color of a document image or an implementation for writing image data of identified colors on a photoconductive element.

SUMMARY OF THE INVENTION

It is therefore an object of the present invention to provide a digital copier capable of copying a document on which characters are printed in black and accompanied by a red seal, stamp, underline or similar marking or red notes, or a document printed in two colors for emphasis or precaution at the same speed as a document carrying information in black only.

It is another object of the present invention to provide a digital copier which, when monocolor documents and bicolor documents are mixed together, copies the former in a single color and the latter in two colors at the same speed without troubling the operator.

It is another object of the present invention to provide an inexpensive digital copier which insures the register of images of two different colors and operates at high speed.

It is another object of the present invention to provide a generally improved digital copier.

A digital copier of the present invention comprises a photoconductive element, a reading device for receiving a light image representative of an object being copied and separating image data of predetermined color to produce a first and a second recording signal, a first image writing device for writing an image on the photoconductive element in response to the first recording signal to electrostatically form a first latent image, a first developing device for developing the first latent image to produce a first toner image, a second image writing device located downstream of the first developing device for writing an image on the photoconductive element in response to the second signal to electrostatically form a second latent image, a second developing device for developing the second latent image to produce a second toner image, and an image transferring device for transferring the first and second toner images to a recording medium at the same time.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
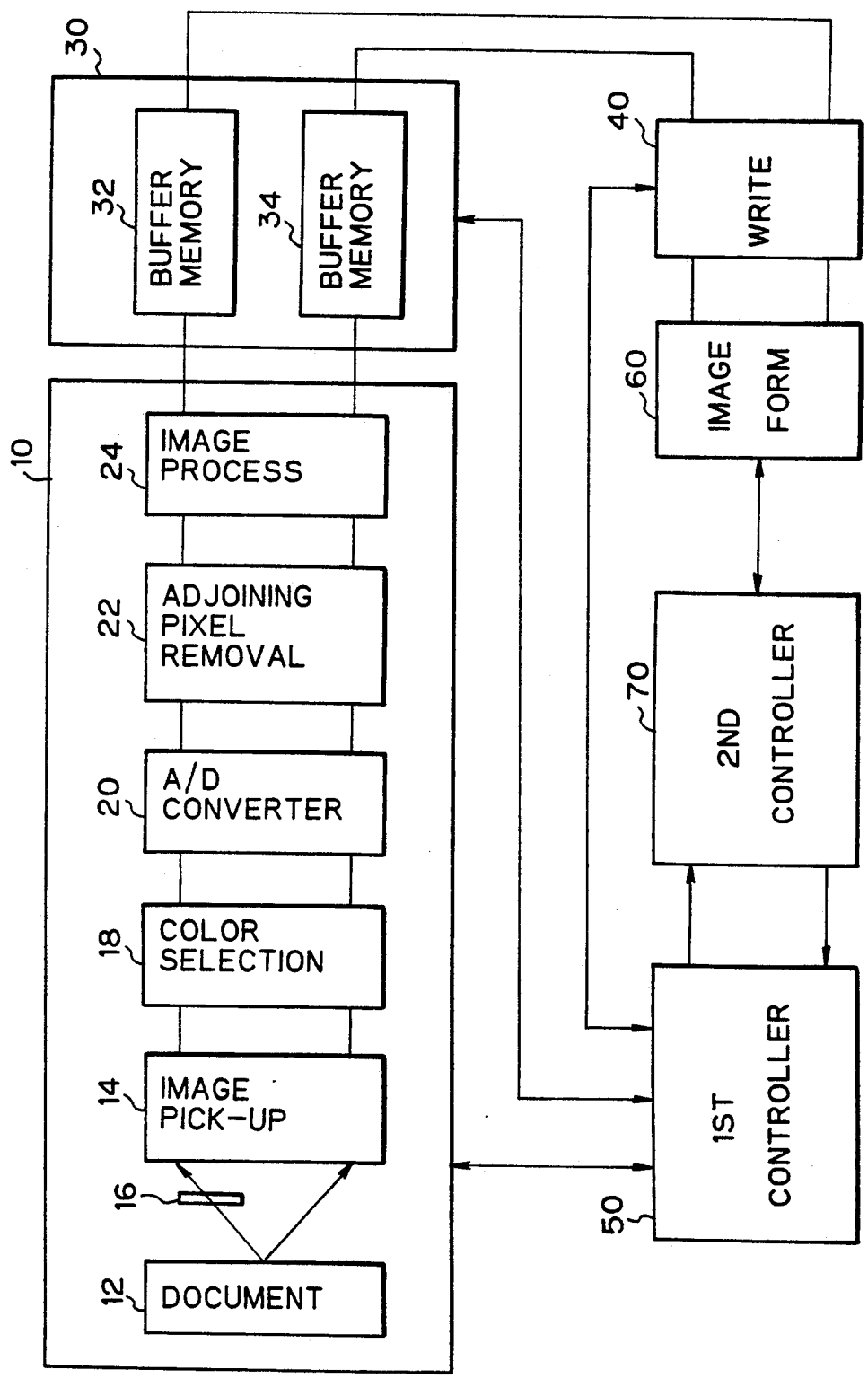
FIG. 1 is a block diagram schematically showing a control system incorporated in a digital copier embodying the present invention.

Referring to FIG. 1 of the drawings, a copier embodying the present invention is shown which is capable of forming a discriminative monocolor image, particularly a control system thereof. As shown, the copier has an image reading device 10 for reading a document 12. The image reading device 10 illuminates the document 12 by a light source, not shown, through a slit while scanning it in a direction perpendicular to the slit. The resultant reflection from the document 12 is propagated through a lens and mirrors which will be described and thereby focused onto an image pick-up device 14. The image pick-up device 14 is implemented as image pick-up circuits arranged in two lines and each comprising a number of photoelectric transducers which are arranged in parallel with the slit. Specifically, a light image not including image data of particular color is focused onto one of the image pick-up circuits via a transmission type filter 16 of color to be identified. A light image of the entire band of the spectrum determined by the light source, lens and mirrors is focused onto the other image pick-up circuit. A color separating circuit 18 separates colors from the output signals of the two image pick-up circuits to produce two different image signals, i.e., a monochromatic image signal representative of the lightness of all of the colors including the color to be separated and an image signal representative of the color of the filter 16. An analog-to-digital (A/D) converter 20 converts such two image signals into digital signals. An adjoining pixel removing circuit 22 removes adjoining pixels if present. An image processing circuit 24 executes predetermined image processing with the output of the circuit 22, if necessary. The resulted image data are written as electric signals to buffer memories 32 and 34 which constitute a video memory 30 associated with a writing device 40.

The writing device 40 transforms the image data fed thereto from the video memory 30 in response to a command from a first controller 1 to an optical signal at a predetermined timing and then writes the optical signal on a photoconductive element. A second controller 70 controls an image forming device 60. Specifically, the second controller 70 interchanges data with the first controller 50 to feed a timing signal to the first controller 50 for causing the writing device 40 to start writing. At the same time, the second controller 70 controls the image forming device 60 in matching relation to the timing signal, causing the device 60 to produce a monocolor hard copy corresponding to the data representative of the identified color.

The operation timings of the reading device 10, writing device 40 and image forming device 60 are controlled by the first and second controllers 50 and 70 which communicate with each other. At the same time, these devices 10, 40 and 60 serve the individual functions while sending and receiving necessary data under the control of the controllers 50 and 70.

Figure 2:
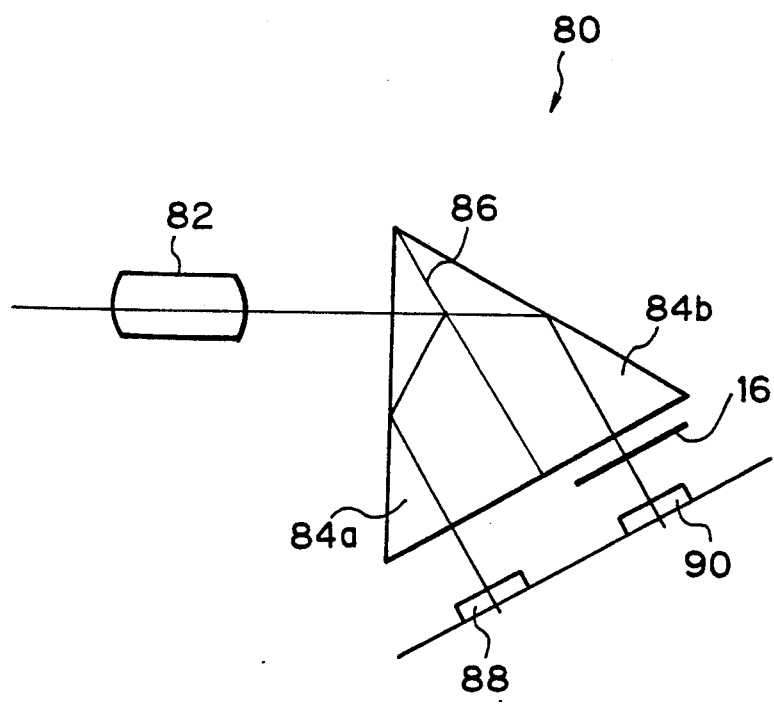
FIG. 2 shows a specific construction of an image pick-up device having a color separating function.

FIG. 2 shows optics 80 interposed between the document 12 and the image pick-up device 14 shown in FIG. 2. The optics 80 is made up of a lens 82, a first and a second prism 84a and 84b for splitting the optical path in order to discriminate colors, and the filter 16. The prisms 84a and 84b have a half-mirror 86 therebetween. The image pick-up device 14 is comprised of two photoelectric transducers implemented as a first and a second CCD array 88 and 90. Light transmitted through the half-mirror 86 and light reflected by the same are totally reflected by the prisms 84b and 84a, respectively, and then incident to the CCD arrays 90 and 88, respectively. The filter 16 of a color to be identified is inserted between the prism 84b and the CCD array 90. For example, when the color to be identified on the document 12 is red, the filter 16 will be a red absorption filter. Using two prisms is advantageous in that the two CCD arrays 88 and 90 can be placed in the same plane and, therefore, assembled and adjusted with ease.

The reflective surfaces of the lens 82, first prism 84a and half mirror 86 are provided with such a characteristic that they do not absorb light of particular spectrum in the visibility band from the reflection from the document 12. Hence, a white light image representative of the document 12 is incident to the first CCD array 88. More specifically, the CCD array 88 receives image information representative of the lightness distribution of the reflection. Assuming that the filter 16 is a red filter which absorbs light other than a red component, the colors of the document 12 other than red and black turn out to be black, a reflection from a red image is transmitted through the filter 16, and only the red component included in the reflection from white is transmitted through the filter 16. As a result, among the image data incident to the second CCD array 90, the reflections from the white area and red area of the document 12 have the same level, i.e., white and black are not distinguishable from each other. The reflection from the areas of other colors is reduced in quantity due to the filter 16 and, therefore, incident to the CCD array 90 as dark data. Stated another way, the image data received by the other CCD array 88 except for the red data is the image data incident to the CCD array 90. This is true with a filter of any other color.

The filter 16 shown in FIG. 2 is replaceable when, for example, a toner stored in a developing device assigned to a second color as will be described is replaced with a toner of another color. If the replacement of the filter 16 is not needed, the function of the filter 16 may be assigned to the second prism 84b, the light transmitted through the half-mirror 86 may be subjected to a filter effect, or the filter 16 may be adhered to the second CCD array 90.

Figure 3:
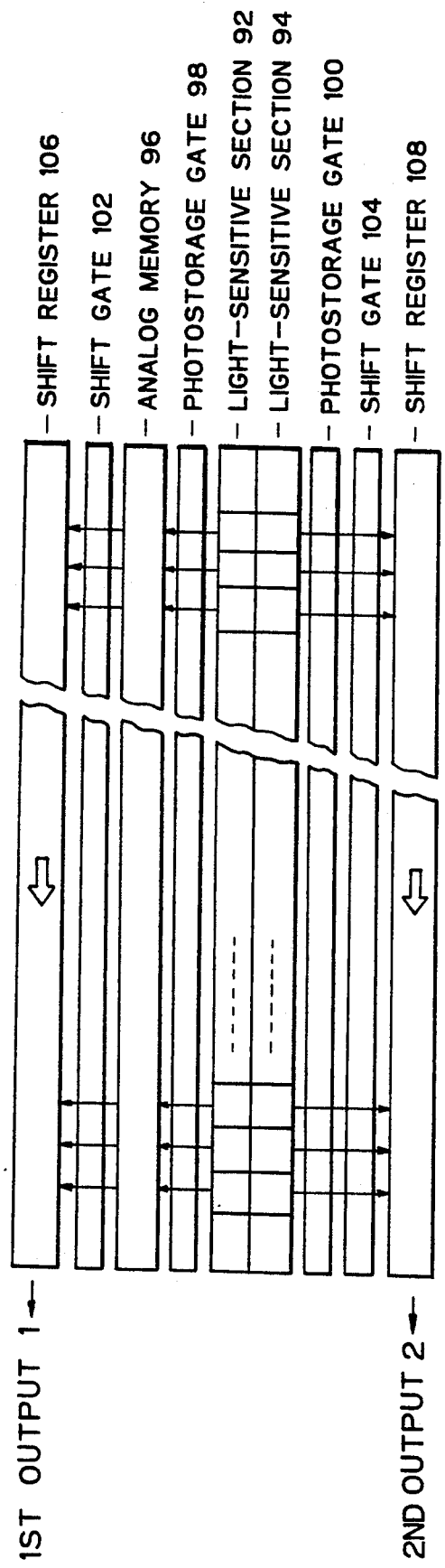
FIG. 3 shows another specific construction of the image pick-up device having a color separating function.

FIG. 3 shows another specific construction of the image pick-up device having a color separation capability. As shown, a first and a second light-sensitive section 92 and 94 adjoin each other at a distance corresponding to one pixel, constituting a 2-line CCD light-sensitive section. Also shown in FIG. 3 is the arrangement of function blocks for manipulating the output signals of the light-sensitive sections 92 and 94. The light-sensitive sections 92 and 94 and the function blocks are assembled in an IC package which is formed with a window at the top thereof for receiving light. A filter is formed on the surface of the IC chip to allow the second light-sensitive section 94 to play the role of the second CCD array 90, FIG. 2. The first light-sensitive section 92 serves as the first CCD array 88, FIG. 2. The light-sensitive sections 92 and 94 extend perpendicular to the direction in which the reading device 10 scans the document 12 while illuminating it through a slit, in a plane onto which the lens 82 focuses a light image. Since the image to be focused onto the 2-line CCD arrays sequentially moves as the scanning proceeds, an arrangement is made such that the first light-sensitive section 92 is located at the upstream side with respect to the moving direction in the focusing plane. Regarding the document scanning direction, the image incident to the light-sensitive section moves in association with the speed at which the document 12 is scanned. Since the two lines are spaced apart by a distance corresponding to one pixel, the scanning speed is selected such that a displacement corresponding to one pixel occurs while one pixel is scanned. Hence, the image sensed by the first light-sensitive section 92 located at the upstream side is sensed by the second light-sensitive element 94 a time corresponding to one pixel later than the first section 92 in the subscanning direction. To distinguish the colors of the document 12, it is necessary to compare image data of the same point of the document. An analog memory 96 is associated with the first or upstream light-sensitive section 92 to compensate for the delay of one pixel. The light-sensitive sections 92 and 94 each transforms light to an electric signal. More specifically, the light-sensitive sections 92 and 94 each changes a current on the basis of the intensity of light and then transforms the change of the current to an amount of charge by integration.

Photostorage gates 98 and 100 each controls the start and stop of the integration. The charges integrated and accumulated over a predetermined period of time are transferred to shift registers 106 and 108 by the shift gates 102 and 104, respectively. The charges transferred to the shift registers 106 and 108 are sequentially shifted as indicated by arrows by a shift clock, not shown. An output section, not shown, transforms the amounts of charge to voltages, i.e., transforms the image data to analog voltage data. The first light-sensitive section 92 operates in the same manner as the second light-sensitive section 94 except that the data is delayed by one line by the associated analog memory 96. In FIG. 3, outputs 1 and 2 correspond to the outputs of the CCD arrays 88 and 90, FIG. 1, respectively.

The color identification system shown in FIG. 3 cannot identify colors other than a particular color, compared to a 3-line CCD array with R, G and B filters. Nevertheless, since the light sensitive sections 92 and 94 are arranged in two lines, the peripheral circuit elements such as the gates 98, 100, 102 and 104 and shift registers 106 and 108 can be arranged at opposite sides of the light-sensitive sections 92 and 94 and, therefore, allow the two sections 92 and 94 to adjoin each other. It follows that only a single buffer suffices for the time lag between the light-sensitive sections 92 and 94 to be compensated for. Moreover, since the system can be simply implemented by IC production technologies, the light-sensitive sections 92 and 94 achieve parallelism and linearity easily and accurately and thereby facilitates the adjustment of the reading device 10. It is to be noted, however, that the color to be identified cannot be changed when only the filter 16 is changed.

Figure 4:
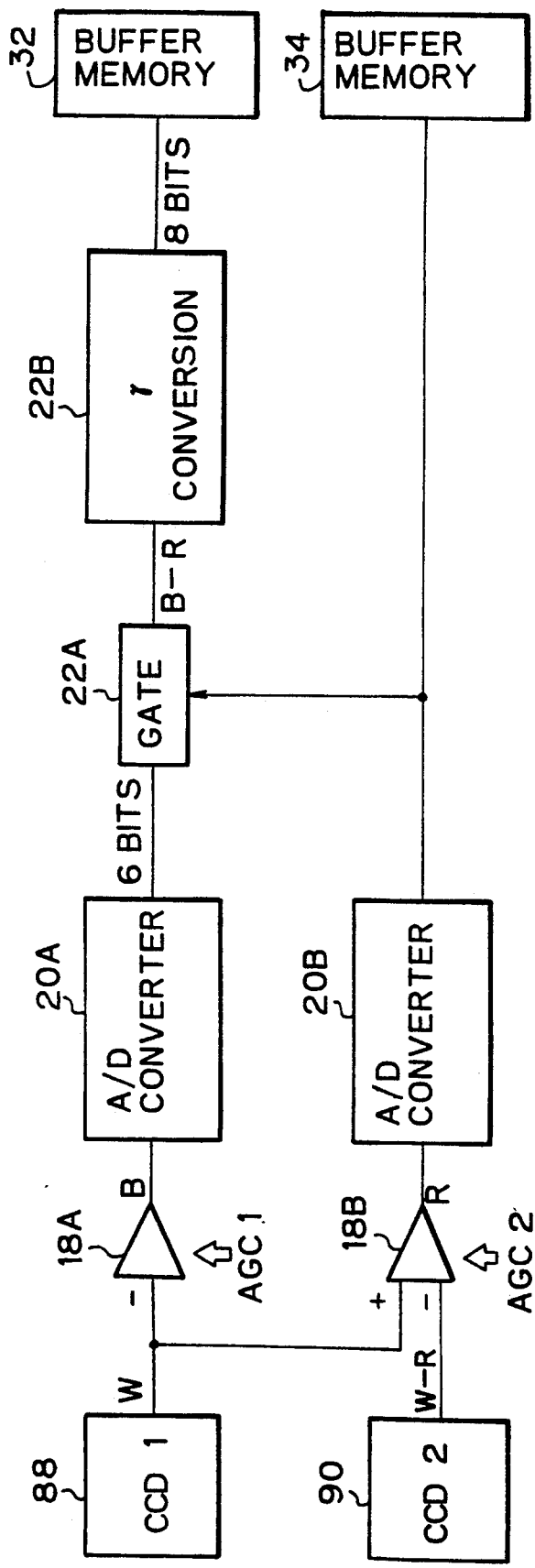
FIG. 4 is a block diagram schematically showing a photoelectric transducer section and successive sections of a reading device included in the embodiment more specifically.

Referring to FIG. 4, the image pick-up section and successive sections included in the reading device 10, FIG. 1, are shown specifically. In FIG. 4, the first and second CCD arrays 88 and 90 correspond respectively to the CCD arrays 88 and 90 shown in FIGS. 2 and 3. The CCD arrays 88 and 90 produce respectively an image signal not associated with the filter 16 and an image signal lacking the component corresponding to the color of the filter 16. Let the output signals of the CCD arrays 88 and 90 be W (white) and W-R (white-red), respectively. In FIG. 4, the signal W is applied to an amplifier 18A whose amplification degree is set by a first external signal automatic gain control AGC1. Specifically, in response to a start command from the controller 50, FIG. 1, the AGC1 sets an amplification degree stored in a memory, not shown, in the amplifier 18A in synchronism with image data. The AGC1, therefore, corrects the decrease in the quantity of light in a peripheral portion ascribable to the lens, the irregular intensity distribution of the lamp, the irregularities of sensitivity among the CCDs, i.e., it executes so-called shading correction. The amplifier 18A is an inverting amplifier and produces an output B. An amplifier 18B receives the signals W and W-R at two inputs thereof which are opposite in polarity to each other. The amplifier 18B subtracts the signal W-R from the signal W while, at the same time, a second external signal AGC2 corrects the result of subtraction, whereby image data T identical in color as the filter is outputted.

An A/D converter 20A converts the output data B (black) of the amplifier 18A to 6-bit digital data. On the other hand, an A/D converter 20B transforms the output data R of the amplifier 18B to 1-bit digital data, i.e., bilevel data. The level for such binarization, like the binarization levels of the amplifiers 18A and 18B, can be changed by a signal from the first controller 50. For example, when the color of a document to be copied is light pink, one may desire to reproduce the background in red or in white. Then, the operator may enter a command on an operating section, not shown, to select a particular level for binarization.

The 6-bit digital data derived from the signal B is transferred to a gamma conversion section 22B via a gate 22A. The gate 22A closes if a bilevel signal resulted from the image data R exists and opens if otherwise. The output of the gate 22A is pulled down such that the output data appearing when the gate 22A is closed is black data. As a result, when a bilevel signal derived from the image data R exists, a blank is inserted as the data B; when it does not exist, the data B is passed through the gate 22A. More specifically, the gate 22A switches the data B by the bilevel data derived from the data R. In this configuration, even if the CCD arrays 88 and 90 are not accurate in linearity or parallelism, it substantially does not occur that an image at a given point is red and black at the same time. The gamma conversion section 22B converts the input 6-bit B-R data to 8-bit data by referencing a table which allows any sixty-four states which can be represented by six bits to be selected from 256 states which can be represented by eight bits. The 8-bit data from the gamma conversion 22B is written to a buffer memory 32. The gamma 22B is capable of rewriting the data of the table by the first controller 50 in order to correct the input and output characteristics of the reading device 10, correct the relation between the quantity of light and the density of an image in the image forming device, and effect binarization as well as negative-positive inversion.

Figure 5:
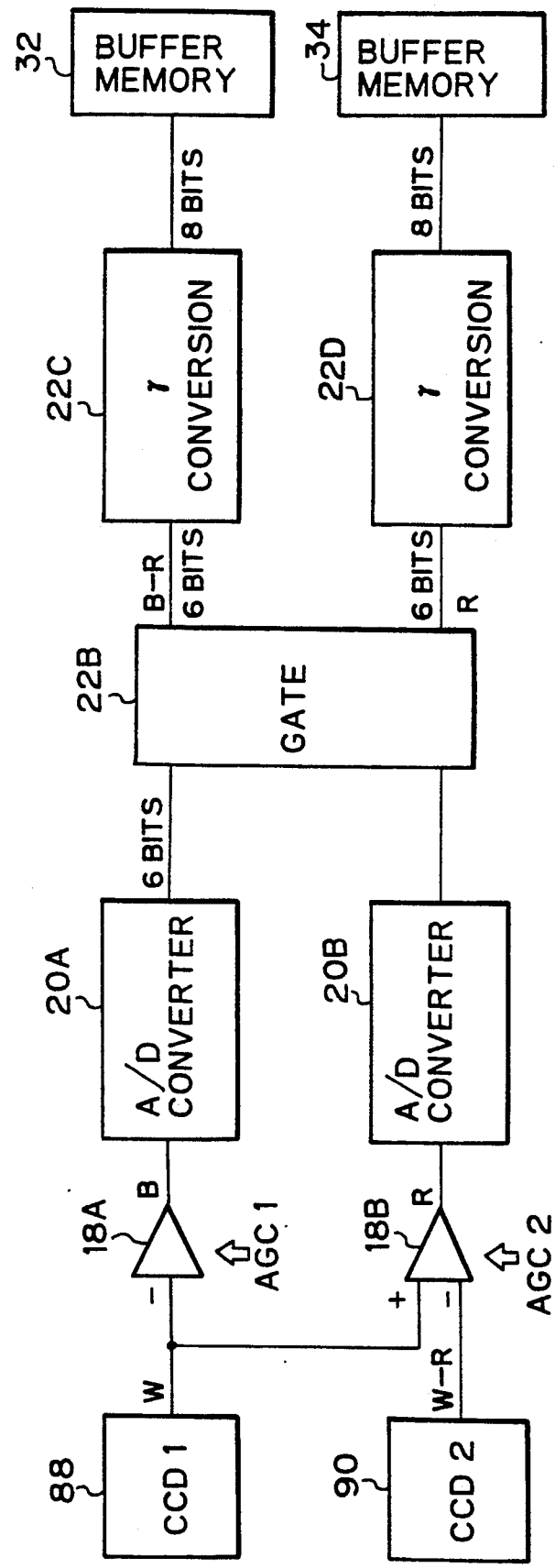
FIG. 5 is a block diagram schematically showing another specific construction of the photoelectric transducer section and successive sections.

FIG. 5 shows another specific construction of the reading device 10 which is applicable to a case wherein both of the first and second data to be written have multiple levels. The construction of FIG. 5 is essentially similar to that of FIG. 4 except that the second data has multiple levels. In FIG. 5, the data B is also switched by the bilevel data R to produce black and red multilevel data. This prevents the image data of two different colors from coinciding with each other.

Figure 6:
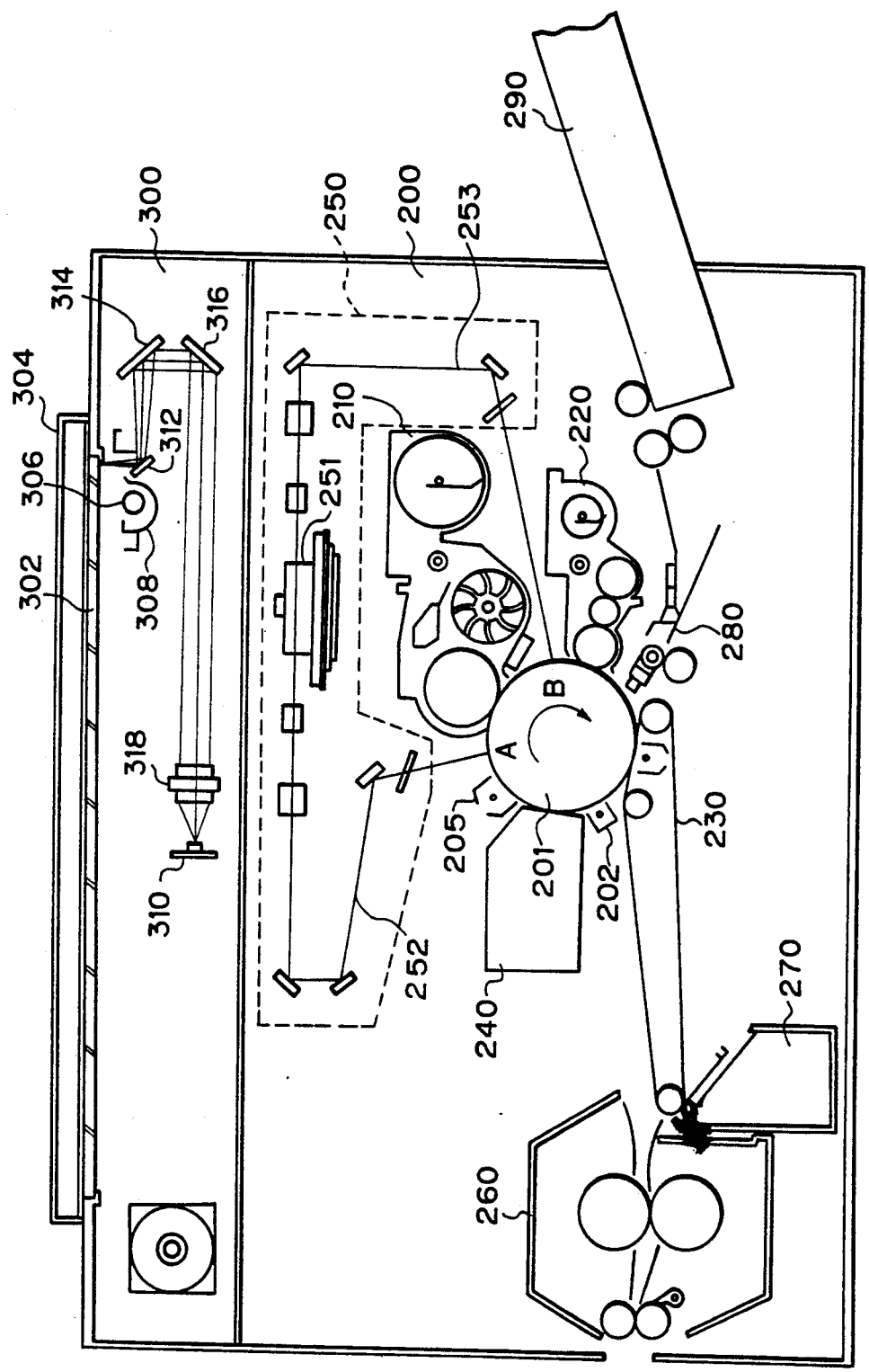
FIG. 6 is a section showing the general construction of the embodiment.

The general construction of the digital copier for forming a discriminative monocolor image of the present invention will be described with reference to FIG. 6.

As shown, the copier is generally made up of a document scanning and reading section 300 and a printer section 200 for forming an image by an electrophotographic process. The document scanning and reading section 300 has a glass platen 302 to be loaded with a document, a cover plate 304 for pressing the document against the glass platen 302, a light source 306 for illuminating the document, a mirror 308 for converging the light from the light source 306 to a portion of the document to be read, mirrors 312, 314 and 316 and a lens 318 for focusing a reflection from the document onto an image pick-up device 310, and a drive mechanism, not shown, including a motor. The image pick-up device 310 and lens 318 correspond in function to the CCD arrays 88 and 90 and lens 82 shown in FIGS. 1 through 5. While the specific construction shown in FIG. 6 uses two CCD arrays 88 and 90, the CCD arrays 88 and 90 may of course be replaced with the prisms 84a and 84b shown in FIG. 2.

In operation, a document is laid on the glass platen 302, and then a print button provided on the operating section is pressed. Then, the lamp 306 is turned on while the motor for scanning the document is driven. A reflection from the document is focused onto the image pick-up device 310. As a result the image pick-up device 310 sequentially outputs image data line by line as the document scanning position sequentially changes. The image data is subjected to the previously stated processing and then written to a buffer memory for matching the scanning and reading section 300 to a writing section which will be described with respect to timing.

The printer section 200 has a writing section 250 surrounded by a dashed line in the figure, a black developing unit 210, a red developing unit 220, an image transfer and paper transport unit 230, a cleaning unit 240, a photoconductive element 201, a discharger 202 for discharging the element 201 before cleaning, a main charger 205 for charging the element 201, a fixing unit 260, a belt cleaning unit 270 for cleaning the unit 230, a paper feed unit 290, and a register unit 280 for causing a paper sheet and an image carried on the element 201 into registration with each other.

The writing section 250 has an 8-sided polygonal mirror 251 which is rotated by a motor. The polygonal mirror 251 in rotation steers a laser beam having been modulated by a black image signal. The laser beam reflected by the polygonal mirror 251 is propagated through optical parts such as an f-theta lens, mirrors and dust glass for scanning the photoconductive element 201 at a constant speed, the resulting light beam being designated by the reference numeral 252. At the same time, the polygonal mirror 251 reflects a laser beam having been modulated by a red image signal and incident to the opposite side of the mirror 251 to the above-mentioned laser beam. The resulted reflection is also propagated through optical parts for scanning the photoconductive element 201 at a constant speed. This light beam is designated by the reference numeral 253. The two light beams 252 and 253 write the image data of two different colors on the photoconductive element 201. The beams 252 and 253 are steered by opposite sides of a single polygonal mirror 251 and, therefore, scan the photoconductive element 201 in opposite directions to each other, as shown in FIG. 7.

Figure 7:
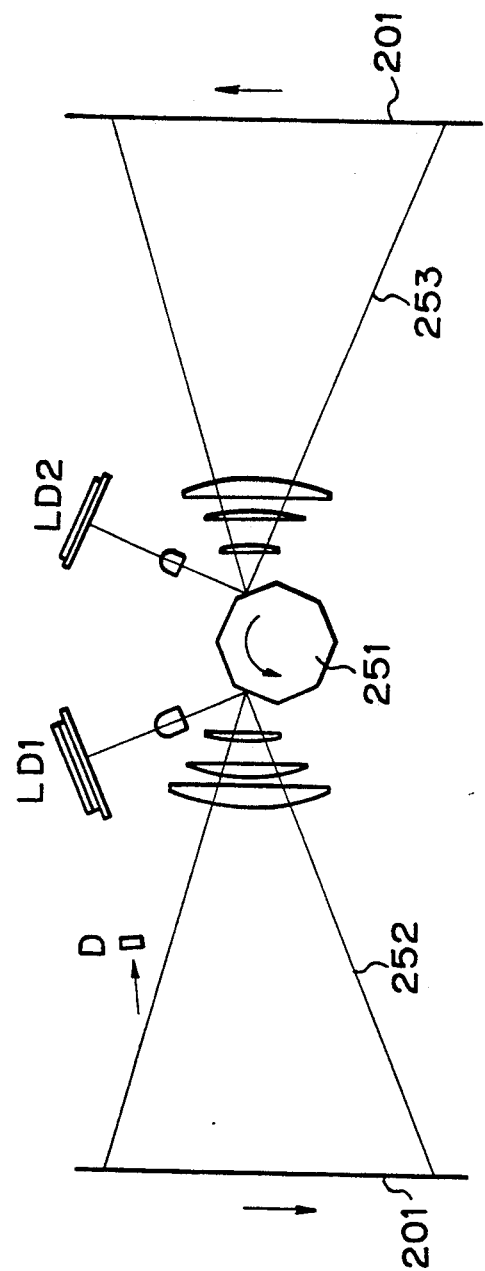
FIG. 7 shows an optical arrangement for steering scanning beams while showing a surface to be scanned in a developed view.

Specifically, in FIG. 7, the polygonal mirror 251 is rotated in a direction indicated by an arrow. The laser beams 252 and 253 each scans the photoconductive element 201 in a particular direction also indicated by an arrow. A semiconductor laser LD1 emits the laser beam 252 associated with black while a semiconductor laser LD2 emits the laser beam 253 associated with red. If the lasers LD1 and LD2 are held in a given positional relation to the polygonal mirror 251, the relation between the laser beams 252 and 253 is determined. For this reason, a sensor D for sensing the position of a laser beam and determining the timing for starting the modulation of the laser beam by each line of data is associated with the laser beam 252 only. The timing for starting modulating the other laser beam 253 is generated by the same sensor D.

A sequence of steps which the copier of FIG. 6 performs for electrophotographically forming an image is as follows.

The main charger 205 uniformly charges the surface of the photoconductive element 201 in a direction indicated by an arrow in the figure. The laser beam 252 having been modulated by black image data writes the data on the charged surface of the photoconductive element 201 at a point A of the latter. The resulted electrostatic latent image is developed by the black developing unit 210 to produce a black toner image on the photoconductive element 201. The laser beam 253 having been modulated by red image data writes the data on another point B of the photoconductive element 201 which carries the black toner image. Then, the red developing unit 220 develops a latent image formed by the red data while being prevented from disturbing the black toner image. As a result, toner images of two different colors are formed on the photoconductive element 201. A paper sheet fed from the paper feeding section 290 is fed to the image transfer and paper transport unit 230 by way of the register unit 280 which causes the leading edge of the paper sheet to meet that of the toner images of two colors. The paper sheet is conveyed by the belt of the transport unit 230 to contact the toner images of two colors carried on the photoconductive element 201. In this condition, a transfer charger located at the back of the belt is energized to transfer the toner images of two colors from the photoconductive element 201 to the paper sheet by corona charge. Thereafter, the paper sheet has the toner images fixed thereon by the fixing unit 260 and then driven out of the copier. After such image transfer, the discharger 202 dissipates the charge remaining on the surface of the photoconductive element 201. The cleaning unit 240 cleans the so discharged surface of the photoconductive element 201, preparing the element 201 for another image forming sequence.

Assume that the document laid on the glass platen 302 includes a portion printed in red. Then, the sequence of steps described above automatically separates the red portion of the document and produces a bicolor copy at exactly the same speed as a copy of a document carrying black images only. Of course, in the case of a document carrying black images only, the copier described above reproduces it in black as an ordinary copier. Therefore, one who operates the copier does not have to see if a desired document includes a red portion. The copier with such a color discriminating capability may of course be provided with the function of a conventional monocolor copier and/or the function of a copier capable of locally changing colors, in addition to the above-stated coloring function.

Figure 8:
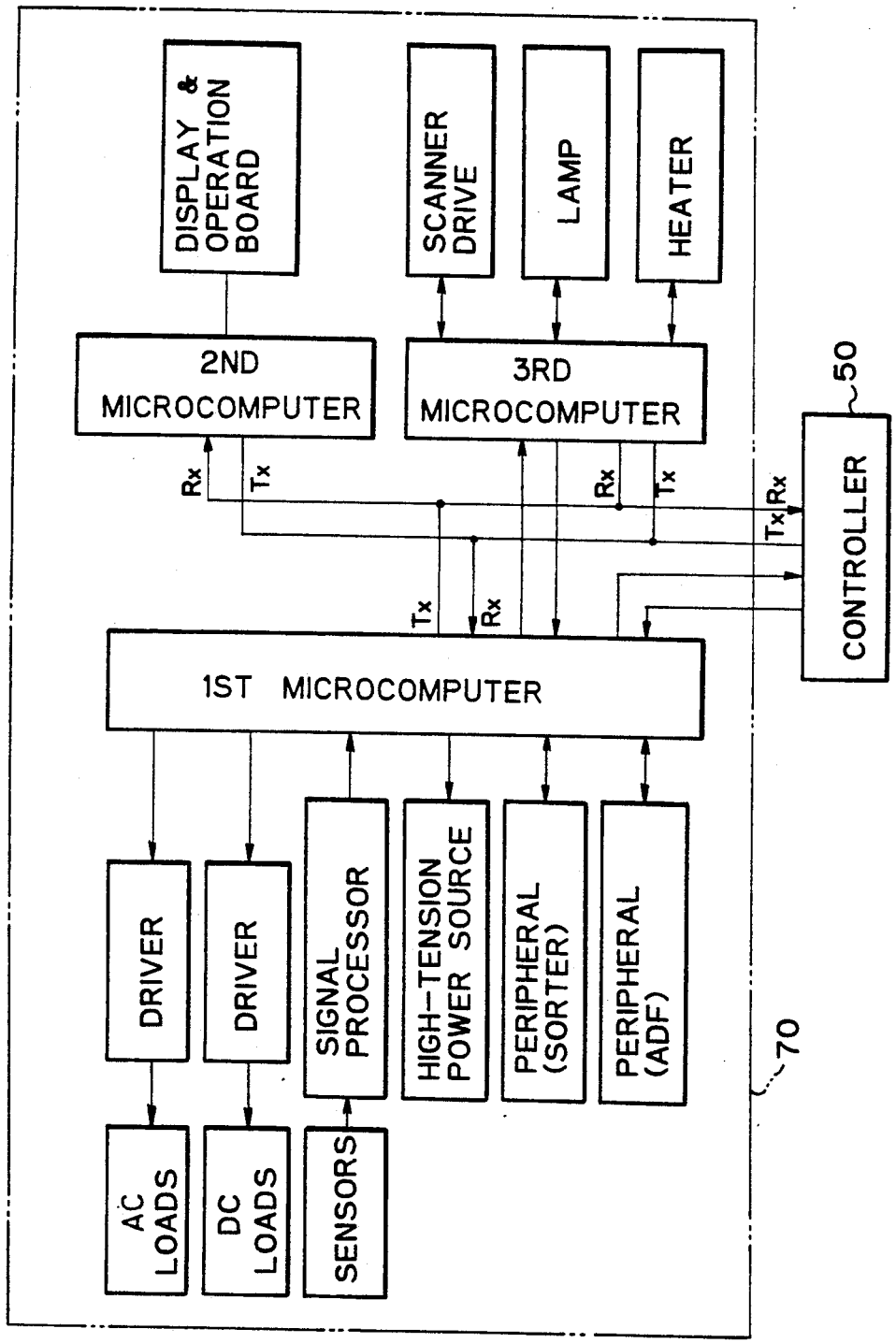
FIG. 8 is a block diagram of a construction of the second controller of the control system of FIG. 1.

FIG. 8 shows a specific construction of the second controller 70 for controlling the copier except for the image reading section, image data processing section, and writing section. As shown, the controller 70 has a first microcomputer 1 for controlling the inputs and outputs of motors, solenoids, clutches and sensing switches included in the printer section, a second microcomputer 2 for controlling a display and operation board, and a third microcomputer 3 for effecting the drive for scanning and the temperature control over the lamp and fixing heater. The first to third microcomputers 1-3 are interconnected by a communication path, and the first microcomputer 1 serves as a master. Additional paths are provided between the microcomputers 1 and 3 and the first controller 50 for the interchange of signals which the above-mentioned communication path cannot implement alone in respect of time. The second controller 70 is constructed and operation in exactly the same manner as the control arrangement of a conventional copier except that it has an interface associated with the first controller 50.

In the illustrative embodiment, the first and second developing units are assumed to be assigned to black and red, respectively, and the colors corresponding to the developing units are identified. Alternatively, the identified color may be developed in another color to achieve a special effect. In this case, since the desired color to be identified will be changed in matching relation to the toner stored in the second developing unit with no regard to the color to be identified, the operation board of the copier may be provided with indicators for indicating the colors of toners and the colors to be identified.

While the present invention has been shown and described in relation to a copier, it is similarly applicable to an electrophotographic printer which forms toner images of two different colors on a photoconductive element by sequentially writing signals representative of recording signals of two colors and then producing a bicolor hard copy by effecting image transfer only once. Particularly, the present invention is practiable as a printer of the type which, when multilevel data including color signals are fed from a generating section, binarizes the data to be written in the second color.

In summary, the present invention provides a digital copier having means for identifying and separating a particular color when monocolor documents and bicolor documents including the particular color are sequentially fed by an ADF (Automatic Document Feeder). Specifically, if the above-mentioned particular color exists in a document image, the copier automatically separates it to produce a bicolor copy; if otherwise, the copier produces a monocolor copy. Of course, when all the images carried on a document are of the particular color, the copier produces a monocolor copy in the particular color. A printer section included in the copier writes the identified and separated data while a photoconductive element is rotated once, effects development color by color, and then performs image transfer and fixation. The printer section, therefore, processes both of bicolor documents and monocolor documents in exactly the same period of time.

Even when a document is laid on the glass platen by hand, i.e., without the ADF being used, it is not necessary for the operator to see if the document is monocolor or bicolor.

Regarding the register of images of two different colors, since such images are read at the same time by a single scanning, the copier is substantially free from deviations ascribable to the irregularities in the start-up time and stop position of a mechanism for scanning a document and motors. Positional errors in the event of reading are ascribable to the non-linearity of two image pick-up devices, the misalignment of pixels in the sub-scanning direction, and the parallelism between the image pick-up devices. In accordance with the present invention, only if required accuracy is set up at the assembly stage, it is preserved and not disturbed the despite repetitive copying operation. A first and a second writing position set at the beginning insures the register of two different images. Therefore, if the copier is adjusted at the assembly stage, it is free from the deviation of the images of different colors and does not need a servo system or similar advanced implementation for position control.

Since the image of the second color is written at a point downstream of the point where the image of the first color is written, a memory is necessary in order to make up for the time lag. Nevertheless, the present invention binarizes at least the image of the second color to reduce the required memory capacity and, therefore, the cost.

Various modifications will become possible for those skilled in the art after receiving the teachings of the present disclosure without departing from the scope thereof.

What is claimed is:

1. A recording apparatus using an electrophotographic process and having a photoconductive element, comprising:

reading means for receiving light image data from an object being copied and separating said image data into data relating to a predetermined color and outputting a first and second recording signal wherein said first recording signal has pixels representing multilevel density data and wherein said second recording signal has pixels representing binarized data;

processing means for alternately blanking and passing said multilevel density data in response to said binarized data to provide a modified first recording signal;

first writing means for forming an electrostatic latent image on the photoconductive element in response to said modified first recording signal;

first developing means for developing the electrostatic latent image formed by said first writing means on the photoconductive element to thereby produce a first toner image;

second writing means for forming an electrostatic latent image on the photoconductive element in response to said second recording signal;

second developing means for developing the electrostatic latent image formed by said second writing means on the photoconductive element to produce a second toner image; and transferring means for simultaneously transferring said first and second toner images formed by said first and second developing means to a recording medium.

2. A recording apparatus as claimed in claim 1, wherein a color separated as the second recording signal and a color of an image to be formed by said second developing means are identical.

3. A recording apparatus as claimed in claim 1, wherein said first toner image was developed by a first toner which is a black toner or a toner having a low lightness level and wherein said second toner image was developed by a second toner having a higher lightness level than said first toner.

4. A recording apparatus using an electrophotographic process and having a photoconductive element, comprising:

reading means for receiving light image data from an object being copied and separating said image data into data relating to a predetermined color and producing a first and second recording signal;

processing means for processing said first recording signal wherein said processing means receives said second recording signal and provides a modified first recording signal resulting from a blanking of said first recording signal when said second recording signal exceeds a predetermined value and a passing of said first recording signal when said second recording signal does not exceed a predetermined value;

first writing means for forming an electrostatic latent image on the photoconductive element in response to said first modified recording signal;

first developing means for developing the electrostatic latent image formed by said first writing means on the photoconductive element to thereby produce a first toner image;

second writing means for forming an electrostatic latent image on the photoconductive element in response to said second recording signal;

second developing means for developing the electrostatic latent image formed by said second writing means on a photoconductive element to produce a second toner image; and transferring means for simultaneously transferring said first and second toner images formed by said first and second developing means to a recording medium.

5. A recording apparatus using an electrophotographic process and having a photoconductive element, comprising:

means for producing a first color related recording signal and a second color related recording signal;

first writing means for forming an electrostatic latent image on the photoconductive element in response to said first recording signal, first developing means for developing the electrostatic latent image formed by said first writing means on the photoconductive element to thereby produce a first toner image;

second writing means for forming an electrostatic latent image on the photoconductive element in response to said second recording signal;

second developing means for developing the electrostatic latent image formed by said second writing means on the photoconductive element to produce a second toner image;

transferring means for simultaneously transferring said first and second toner images formed by said first and second developing means to a recording medium;

wherein said first writing means includes means for forming said image on a sheet of paper having a high lightness level;

decision means for determining when a color to be written by said writing means has a high lightness level and for determining whether a color has a low lightness level whereby, when it is determined that said color has a high lightness level, said decision means includes a means for writing multilevel data on the said sheet and, when it is determined that said color has a low lightness level, said decision means includes means for writing bilevel data on said sheet; and control means for storing bilevel data in a memory means during an interval between writing of multilevel data and writing a bilevel data and, after the writing of said multilevel data, said control means writes said bilevel data stored in said memory means.

* * * * *